United States Patent Office 3,029,233
Patented Apr. 10, 1962

3,029,233
9α-HYDROXY-STEROIDS AND PROCESS FOR THEIR MANUFACTURE
Raymond M. Dodson, Park Ridge, and Robert D. Muir, Deerfield, Ill., assignors to G. D. Searle & Co., Chicago, Ill., a corporation of Delaware
No Drawing. Filed Sept. 2, 1960, Ser. No. 53,618
Claims priority, application Germany Sept. 5, 1959
9 Claims. (Cl. 260—239.57)

The present invention relates to 9α-hydroxy-steroids and to a microbiological process for the introduction of the 9α-hydroxy group by means of microorganisms of the class Schizomycetes. More specifically, it has been found that members of the genus Nocardia have high activity, the most suitable species being *Nocardia corallina*.

In the practice of this invention, the conversion may be effected in a growing culture of the microorganisms either by adding the steroid to the culture during the incubation period, or by including it in the nutrient medium prior to inoculation. Assimilable sources of nitrogen and carbon should be present in the culture medium. An adequate sterile air supply should be maintained during the conversion, for example, by the conventional techniques either of exposing a large surface of the medium to the sterile air or by passing air through a submerged culture.

Sources of nitrogenous growth-promoting factors are those normally employed in such processes. They may be natural organic materials such as soy bean meal, corn steep liquor, meat extracts, peptone, and/or distiller's solubles, or synthetics such as nitrates and ammonium compounds.

Suitable energy source materials which may be utilized in the process of this invention include meat extracts, peptone, and the like, which also serve as nitrogen sources, or other conventional carbon-containing materials such as carbohydrates of the type exemplified by glycerol, glucose, fructose, dextrose, sucrose, lactose, maltose, dextrines, starches, and whey. These materials may be used either in purified states or as concentrates, such as whey concentrate, corn steep liquor, grain mashes, and the like, or as mixtures of the above. The steroids may be added to the culture during the incubation period or, alternatively, may be included in the medium prior to sterilization or inoculation. The preferred, but not limiting range of concentration of the steriod in the culture is about 0.025%–0.1%. The time interval required for the action of the enzymatic system of the microorganisms employed may vary considerably, the range of about 2 to 96 hours being practical but not limiting.

Suitable substrates for the practice of this invention are those 3-keto-Δ⁴-steroids which lack substituents in the 9- and 11-positions, and are substituted at the 17-position by a group containing at least 2 carbon atoms. Specific examples of suitable starting materials are progesterone, 17α-hydroxyprogesterone, 21-hydroxyprogesterone, 17α,21-dihydroxyprogesterone, and 17α - (2-carboxyethyl)-17β-hydroxyandrost-4-en-3-one lactone.

The compounds of this invention are useful as intermediates in the manufacture of pharmacologically-active agents. Treatment with hydrogen fluoride and pyridine, for example, results in the corresponding 9α-fluoro compounds, which are known useful pharmacological agents. Those 9-fluoro derivatives containing the ketol

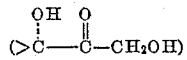

side-chain possess anti-inflammatory activity, while the corresponding compounds lacking the 17-hydroxy group are potent mineralocorticoid agents, and the 21-unsubstituted pregnenes are progestational agents. The aforementioned 9α-hydroxy-17-spirolactones are useful as intermediates in the preparation of the corresponding 9-halo-11-oxygenated potent desoxycorticosterone acetate inhibitors and progestational agents, disclosed in U.S. Patent 2,925,416. This transformation is effected by dehydration of the instant 9α-hydroxy compound, suitably by short contact with hydrogen fluoride in pyridine at about −15°, to yield the 9,11-dehydro intermediates, disclosed in the aforementioned patent, which are then treated further in accordance with the teachings therein to produce the desired 9-halo-11-oxygenated spirolactones.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A medium consisting of 6 parts of commercial beef extract, 10 parts of commercial peptone and 2000 parts of distilled water is sterilized by heating to a temperature of 120° for one hour, cooled, and inoculated with a culture of Nocardia sp., ATCC 13934. The mixture is incubated for about 72 hours at a temperature of about 25°.

A medium consisting of 75 parts of commercial beef extract, 125 parts of commercial peptone, 25,000 parts of tap water and 5 parts of a silicone anti-foaming agent is mixed in a stainless steel fermentor and sterilized by the addition of live steam under pressure to a temperature of about 110–120° and a final volume of about 30,000 parts. To the resulting sterile medium, when cooled to 25°, is added 2000 parts of an inoculum prepared as described supra. The mixture is agitated mechanically while introducing sterile air at a rate of about 10,000 parts by volume per minute. The microorganism is permitted to grow under these conditions for about 67.5 hours at a temperature of 25°. After the growth phase of the microorganism is completed, a solution of 10 parts of 17α-(2-carboxyethyl)-17β-hydroxyandrost-4-en-3-one lactone in 80 parts of acetone is added, and the fermentation is continued for an additional 7.5 hours. The mixture is extracted with 20,000 parts of methylene chloride for about 45 minutes. The methylene chloride extract is concentrated in vacuo to dryness, and the resulting residue is dissolved in benzene, then chromatographed on silica gel. The chromatographic column is eluted with benzene, then with benzene solutions containing increasing concentrations of ethyl acetate. The 80% ethyl acetate in benzene eluate is concentrated to dryness, and the residue is recrystallized from acetone-hexane to afford 17α-(2-carboxyethyl)-9α,17β-dihydroxyandrost-4-en-3-one lactone, M.P. 228–230°; $[\alpha]_D = +76.1°$ (chloroform). It exhibits an ultraviolet maximum at about 241 millimicrons with an extinction coefficient of about 15,740.

*Example 2*

A liquid medium containing 5 parts of commercial peptone, 3 parts of commercial beef extract, and 1000 parts of tap water is sterilized by heating to a temperature of about 110–120° for one hour, cooled, and inoculated with a culture of Nocardia sp., ATCC 13934. The mixture is incubated for about 72 hours in a temperature range of 22–27°.

A medium of the same composition as described in paragraph 2 of Example 1 is sterilized by the addition of live steam under pressure at a temperature of 120° for 15 minutes, then cooled. To 1000 parts of the resulting sterile medium is added 10 parts of the culture, prepared as described supra. The mixture is agitated mechanically in the presence of sterile air. The microorganism is permitted to grow under these conditions at a temperature of 25° until the growth phase is completed. Then, to a solution of about 1000 parts of the culture is added 10 parts of an acetone solution containing 0.25 part of 21-hydroxyprogesterone. Incubation is continued in the presence of the steroid substrate for a period of 48 hours, after which steroidal materials are extraced from the culture by means of methylene chloride. The methylene chloride is evaporated to afford 9α,21-dihydroxypregn-4-ene-3,20-dione, which can be purified by chromatography followed by recrystallization from aqueous acetone.

*Example 3*

A medium consisting of 6 parts of commercial beef extract, 10 parts of commercial peptone, and 2000 parts of distilled water is sterilized by heating to a temperature of about 120° for one hour, cooled, and inoculated with a culture of *Nocardia corallina*, ATCC 13259. The mixture is incubated for about 72 hours at a temperature of about 25°.

A medium consisting of 75 parts of commercial beef extract, 125 parts of commercial peptone, 50 parts of commercial yeast extract, 10 parts of an oil-type anti-foaming agent and 25,000 parts of tap water is mixed in a stainless steel fermentor and sterilized by addition of live steam under pressure to a temperature of about 110–120° and a final volume of about 30,000 parts. To the resulting sterile medium, cooled to 25°, is added 2,000 parts of an inoculum prepared as described supra. The mixture is agitated mechanically while introducing sterile air at a rate of about 10,000 parts by volume per minute. The microorganism is permitted to grow under these conditions for about 25 hours at a temperature of 25°. After the growth phase is complete, a solution of 10 parts of progesterone in 197 parts of acetone is added, and the fermentation is continued for an additional 18 hours. The mixture is extracted with 18,900 parts of methylene chloride. The steroid-rich layer is separated and the aqueous phase is extracted again with methylene chloride as above. The methylene chloride extracts are combined and concentrated in vacuo. The residue is dissolved in 400 parts of 10% ethyl acetate in benzene, then applied to a chromatography column containing silica gel. This column is eluted with benzene containing increasing amounts of ethyl acetate. Upon elution with a solution of 40% ethyl acetate in benzene followed by recrystallization of the residue from a mixture of acetone and cyclohexane, then from aqueous methanol, there is obtained 9α-hydroxypregn-4-ene-3,20-dione, M.P. about 193–194.5°; $[\alpha]_D = +185°$.

9α-hydroxypregn-4-ene-3,20-dione is obtained also when Nocardia sp., ATCC 13934 is substituted in the process of this example.

*Example 4*

A medium consisting of 6 parts of commercial beef extract, 10 parts of commercial peptone, and 2000 parts of distilled water is sterilized by heating to a temperature of about 120° for one hour, cooled, and inoculated with a culture of *Nocardia corallina*, ATCC 13258. The mixture is incubated for about 72 hours at a temperature of about 25°.

A medium consisting of 75 parts of commercial beef extract, 125 parts of commercial peptone, 50 parts of commercial yeast extract, 10 parts of an oil-type anti-foaming agent, and 25,000 parts of tap water is mixed in a stainless steel fermentor and sterilized by the addition of live steam under pressure to a temperature of about 110–120° and a final volume of about 30,000 parts. To the resulting sterile medium, when cooled to 25°, is added 2000 parts of an inoculum prepared as described supra. The mixture is agitated mechanically while introducing sterile air at a rate of about 10,000 parts by volume per minute. The microorganism is permitted to grow under these conditions for about 25 hours at a temperature of about 25°. After the growth phase is completed, a solution of 10 parts of 17α,21-dihydroxypregn-ene-3,20-dione in 790 parts of acetone is added. Fermentation is continued for an additional 24 hours, and the mixture is extracted with 18,900 parts of methylene chloride. The organic layer is separated and the aqueous phase is extracted again with methylene chloride. The methylene chloride extracts are combined then concentrated in vacuo. The residue is chromatographed, then recrystallized from aqueous acetone to yield 9α,17α,21-trihydroxypregn-4-ene-3,20-dione.

*Example 5*

A medium consisting of 6 parts of commercial beef extract, 10 parts of commercial peptone, and 2,000 parts of distilled water is sterilized by heating to a temperature of about 120° for one hour, cooled, and inoculated with a culture of Nocardia sp., ATCC 13934. The mixture is incubated for about 72 hours at a temperature of about 25°.

A medium consisting of 75 parts of commercial beef extract, 125 parts of commercial peptone, 50 parts of commercial yeast extract, 10 parts by volume of an oil-type anti-foaming agent, and 25,000 parts of tap water is mixed in a stainless steel fermentor and sterilized by the addition of live steam under pressure to a temperature of about 110–120° and a final volume of about 30,000 parts. To the resulting sterile medium, when cooled to 25°, is added 2000 parts of an inoculum prepared as described supra. The mixture is agitated mechanically while introducing sterile air at a rate of about 10,000 parts by volume per minute. The microorganism is permitted to grow under these conditions for about 25 hours at a temperature of 25°. After the growth phase is completed, a solution of 10 parts of 17α-hydroxyprogesterone in 790 parts of acetone is added, and the fermentation is continued for an additional 30 hours. The mixture is extracted with about 18,900 parts of methylene chloride. This organic solution is separated, and the aqueous phase is re-extracted with methylene chloride. The methylene chloride extracts are combined and concentrated in vacuo to afford 9α,17α-dihydroxypregn-4-ene-3,20-dione, which can be purified by recrystallization from aqueous acetone.

What is claimed is:

1. A process for the manufacture of 11-unsubstituted 9α-hydroxy-3-keto-Δ⁴-steroids containing a 17-substituent of at least 2 carbon atoms, which comprises contacting the corresponding 17-substituted 3-keto-Δ⁴-steroid unsubstituted at the 9- and 11-positions, with the enzymes produced by a growth of an organism of the genus Nocardia.

2. A process for the manufacture of 11-unsubstituted 9α-hydroxy-3-keto-Δ⁴-steroids of the pregnane series, which comprises contacting the corresponding 9,11-unsubstituted 3-keto-Δ⁴-steroid of the pregnane series, with the enzymes produced by a growth of an organism of the genus Nocardia.

3. A process for the manufacture of 9α-hydroxypregn-4-ene-3,20-dione, which comprises contacting progesterone with the enzymes produced by a growth of an organism of the species *Nocardia corallina*.

4. A process for the manufacture of 9α,17α-dihydroxypregn-4-ene-3,20-dione which comprises contacting 17α-hydroxypregn-4-ene-3,20-dione with the enzymes produced by a growth of an organism of the species *Nocardia corallina*.

5. A process for the manufacture of 9α,21-dihydroxypregn-4-ene-3,20-dione which comprises contacting 21-hydroxypregn-4-ene-3,20-dione with the enzymes produced by a growth of an organism of the species *Nocardia corallina*.

6. A process for the manufacture of 9α,17α,21-trihydroxypregn-4-ene-3,20-dione which comprises contacting 17α,21-dihydroxypregn-4-ene-3,20-dione with the enzymes produced by a growth of an organism of the species *Nocardia corallina*.

7. A process for the manufacture of 17α-(2-carboxyethyl)-9α,17β-dihydroxyandrost-4-en-3-one lactone which comprises contacting 17α-(2-carboxyethyl)-17β-hydroxyandrost-4-en-3-one lactone with the enzymes produced by a growth of an organism of the species *Nocardia corallina*.

8. 17α-(2-carboxyethyl) - 9α,17β - dihydroxyandrost-4-en-3-one lactone.

9. 9α,17α-dihydroxypregn-4-ene-3,20-dione.

References Cited in the file of this patent

Dodson et al.: J. Amer. Chem. Soc., vol. 80, page 6148 (1958).